United States Patent [19]
Doong et al.

[11] Patent Number: 5,997,611
[45] Date of Patent: Dec. 7, 1999

[54] SINGLE VESSEL GAS ADSORPTION SYSTEM AND PROCESS

[75] Inventors: Shain-Jer Doong, Millington; Andrew William Shuttleworth, Morris Plains, both of N.J.; John R. Ambriano, Allentown, Pa.; Apurva Maheshwary, Nutley; Ian Douglas Travis, Stewartsville, both of N.J.

[73] Assignee: The BOC Group, Inc., Murray Hill, N.J.

[21] Appl. No.: 09/122,319

[22] Filed: Jul. 24, 1998

[51] Int. Cl.$^6$ .................................................. B01D 53/053
[52] U.S. Cl. ................................ 95/101; 95/102; 95/105; 95/130; 96/144
[58] Field of Search ..................... 95/96–98, 100–105, 95/130; 96/108, 144

[56] References Cited

U.S. PATENT DOCUMENTS

| | | | |
|---|---|---|---|
| 3,176,444 | 4/1965 | Kiyonaga | 95/97 X |
| 3,430,418 | 3/1969 | Wagner | 95/100 X |
| 3,796,022 | 3/1974 | Simonet et al. | 95/96 |
| 4,168,149 | 9/1979 | Armond et al. | 95/96 X |
| 4,552,571 | 11/1985 | Dechene | 95/96 X |
| 4,561,865 | 12/1985 | McCombs et al. | 55/25 |
| 4,599,094 | 7/1986 | Werner et al. | 95/101 |
| 4,892,566 | 1/1990 | Bansal et al. | 95/98 |
| 4,948,391 | 8/1990 | Noguchi | 95/98 |
| 5,226,933 | 7/1993 | Knaebel et al. | 95/96 |
| 5,268,023 | 12/1993 | Kirner | 95/103 |
| 5,370,728 | 12/1994 | LaSala et al. | 95/101 |
| 5,403,385 | 4/1995 | Pan | 95/130 X |
| 5,411,578 | 5/1995 | Watson et al. | 95/101 |
| 5,518,526 | 5/1996 | Baksh et al. | 95/100 |
| 5,565,018 | 10/1996 | Baksh et al. | 95/100 |
| 5,620,501 | 4/1997 | Tamhankar et al. | 95/96 X |
| 5,658,371 | 8/1997 | Smolarek et al. | 95/101 |
| 5,679,134 | 10/1997 | Brugerolle et al. | 95/96 |
| 5,733,359 | 3/1998 | Doong et al. | 95/98 X |
| 5,772,737 | 6/1998 | Andreani et al. | 95/98 |
| 5,846,294 | 12/1998 | Doong | 95/98 |
| 5,871,565 | 2/1999 | Leavitt | 95/100 |
| 5,882,380 | 3/1999 | Sircar | 95/98 |

*Primary Examiner*—Robert Spitzer
*Attorney, Agent, or Firm*—Philip H. Von Neida; Salvatore P. Pace

[57] ABSTRACT

A process for separating the components of a gas mixture in a single adsorption vessel pressure swing adsorption system including the steps: (a) cocurrently passing the gas mixture through the adsorption vessel at a desired adsorption pressure and collecting the nonadsorbed product gas in a storage vessel, (b) cocurrently depressurizing the adsorption vessel and pumping gas removed from the adsorption vessel during this step to the storage vessel, (c) regenerating the adsorbent in the adsorption vessel by countercurrently depressurizing the adsorption vessel, and (d) repressurizing the adsorption vessel to the desired adsorption pressure. Steps (a) and (b) are carried out using gas pumping or compressing devices, and the same or different gas pumping or compressing devices can be used for steps (a) and (b). Step (c) can also be carried out with the pumping device used in step (a). The apparatus used to carry out the process includes a single adsorption vessel adsorption system, a pump to charge feed gas into and withdraw strongly adsorbed gas from the adsorption vessel and a pump to transfer nonadsorbed product gas from the adsorption vessel to the storage vessel, and the system may have a single pump or a pair of pumps for the gas transfer operations.

27 Claims, 4 Drawing Sheets

SINGLE VESSEL GAS ADSORPTION SYSTEM AND PROCESS

FIELD OF THE INVENTION

This invention relates to the separation of components of a gas mixture by pressure swing adsorption (PSA), and more particularly to the separation of gas components by PSA using an adsorption system comprising a single adsorption vessel.

BACKGROUND OF THE INVENTION

Pressure swing adsorption is a useful method of separating the components of gas mixtures when one or more of the components of the mixture are more strongly adsorbed by an adsorbent than are one or more other components of the gas mixture. PSA processes are intermittent in the sense that nonadsorbed gas is produced by passing the feed gas through a bed of the chosen adsorbent until the adsorbent becomes saturated, and then the adsorption bed is taken out of service so that the bed of adsorbent can be regenerated. This is accomplished by depressurizing the bed of adsorbent and, optionally, purging the adsorbent with nonadsorbed gas, to remove the sorbed component from the adsorbent. The regenerated bed of adsorbent is then put back into adsorption service.

In some adsorptive gas separation applications, it is desirable that one or more of the separated components be provided on a substantially continuous basis. This can be conveniently accomplished by using an adsorption system comprising a battery of two or more adsorption vessels operated in parallel and out of phase. This is generally the preferred procedure when the product gas is required on a large volume basis, for example, when more than about 20,000 normal cubic feet per hour (NCFH) of product gas is required. Multiple bed plants are not very attractive for applications in which the product gas is required at less than about 20,000 NCFH, because of the high cost of the adsorption equipment and the complex multiple valve and gas line systems required for efficient operation of such plants.

Single adsorption vessel adsorption systems can be operated in a manner such that the product gas is available on a continuous basis. This is accomplished by designing the system so that it produces sufficient gas product on an intermittent basis to meet the total product demand, and storing the product gas in a buffer tank to provide a continuous supply of the product gas at the desired pressure. U.S. Pat. Nos. 4,561,865 and 4,892,566 illustrate single vessel adsorption systems which have a surge tank to hold nonadsorbed product gas. The cycles described in these patents is relatively simple with a countercurrent depressurization step following the gas production step.

U.S. Pat. Nos. 5,370,728 and 5,658,371 disclose single vessel PSA systems which improve on the processes described in U.S. Pat. No. 4,561,865 and U.S. Pat. No. 4,892,566 in that they include a cocurrent depressurization step in which void space gas, i. e., nonadsorbed gas remaining in the adsorption vessel at the end of the adsorption step, is collected and stored in an equalization vessel for later use in purging and/or repressurizing the adsorption vessel in preparation for the next adsorption step. The processes of U.S. Pat. No. 5,370,728 and U.S. 5,658,371 are costly to operate because they require two gas storage vessels and associated piping and valves.

Adsorption processes and equipment configurations which are more efficient than those currently in use are continually sought. The present invention provides a single adsorption vessel-based process which increases the yield of nonadsorbed product gas and makes more efficient use of the partially fractionated void space gas, and provides a simpler single vessel adsorption system than currently available systems.

SUMMARY OF THE INVENTION

The invention accomplishes the goal of increasing the yield of nonadsorbed product gas produced in each adsorption cycle of the process of the invention, without significantly lowering the purity of the nonadsorbed product gas.

A first embodiment of the invention comprises a process for the separation of a gas enriched in a first component from a gas mixture comprising the first component and at least one other component comprising repeatedly performing in sequence, in an adsorption system comprising a single adsorption vessel containing an adsorbent which selectively adsorbs the at least one other component, the steps:

(a) cocurrently introducing the gas mixture at a superatmospheric adsorption pressure into the adsorption vessel, thereby adsorbing the at least one other component, while cocurrently withdrawing first component-enriched gas from the adsorption vessel and transporting the first component-enriched gas to a storage vessel;

(b) depressurizing the adsorption vessel by cocurrently withdrawing first component-enriched gas from the adsorption vessel, and transporting the withdrawn first component-enriched gas to the storage vessel;

(c) countercurrently depressurizing the adsorption vessel, thereby desorbing the at least one other component from the adsorbent and withdrawing first component-depleted gas from the single adsorption vessel;

(d) pressurizing the adsorption vessel to the superatmospheric adsorption pressure by: (1) countercurrently introducing first component-enriched gas from the storage vessel thereinto, (2) cocurrently introducing the gas mixture thereinto, or (3) a combination of (1) and (2).

In a preferred embodiment of the above-stated broad process of the invention, the adsorption vessel is depressurized during step (b) of the cycle to a pressure below the pressure of the first component-enriched gas in the storage vessel.

In another preferred embodiment of the broad process, the adsorption vessel is countercurrently evacuated to subatmospheric pressure during step (c) of the cycle.

In another preferred embodiment of the process of the invention, the adsorption cycle includes, between steps (c) and (d), above, the additional step of introducing first component-enriched gas from the storage vessel countercurrently into the adsorption vessel while countercurrently evacuating the adsorption vessel.

In another preferred embodiment of the process of the invention, steps (b) and (c) partly overlap.

In one aspect of the broad process, step (d) comprises cocurrently introducing the gas mixture into the adsorption vessel. In an alternative aspect, step (d) comprises countercurrently introducing first component-enriched gas from the storage vessel into the adsorption vessel and then cocurrently introducing the gas mixture thereinto. In another alternative aspect, step (d) comprises countercurrently introducing first component-enriched gas from the storage vessel into the adsorption vessel, then countercurrently introducing first component-enriched gas from the storage vessel into the adsorption vessel while cocurrently introducing the gas mixture thereinto, then cocurrently introducing the gas mixture into the adsorption vessel.

In a preferred embodiment of the process of the invention, the first component-enriched gas produced during step (a) is transported to the storage vessel using gas pumping means. In the same or another preferred embodiment of the invention, step (b) is accomplished using gas pumping means. In another preferred embodiment of the process of the invention, the gas pumping means used to transport nonadsorbed gas produced during step (a) to the storage vessel and/or the gas pumping means used to perform step (b) is the first stage of a two-stage gas compressor. In this preferred embodiment, the second stage of the two-stage gas compressor can be used to pump nonadsorbed product gas from the storage vessel.

In a preferred embodiment, the gas mixture is introduced into the single adsorption vessel during step (a) of the cycle using gas pumping means. In one preferred aspect of this preferred embodiment, step (b) of the cycle is accomplished using the same gas pumping means that was used in step (a). In another preferred aspect of this preferred embodiment, step (c) is accomplished using the same gas pumping means that was used in step (a).

In the embodiment in which steps (b) and (c) of the cycle overlap, the withdrawal and transporting of first component-enriched gas can be accomplished using a first gas pumping means. Also, during the time when steps (b) and (c) overlap, the single adsorption vessel can be evacuated using a second gas pumping means.

The process of the invention is ideal for separating air into oxygen-enriched air and oxygen-depleted air. When the process is used to separate air, the process is preferably operated to produce oxygen or oxygen-enriched air as the nonadsorbed product.

In a preferred embodiment of the invention, step (a), the adsorption step of the cycle, is carried out at a pressure in the range of about 1.1 to about 30 bara. In this or another preferred embodiment, the pressure in the adsorption vessel is reduced to about 0.5 to about 15 bara during step (b) of the cycle. Also, in this or another preferred embodiment, the pressure in the adsorption vessel is preferably reduced to a value in the range of about 0.15 to about 0.8 bara during step (c) of the cycle.

In another embodiment, the invention comprises adsorption apparatus for separating the components of a gas mixture comprising:

(a) a single adsorption vessel containing an adsorbent which selectively adsorbs at least one component of the gas mixture, the single adsorption vessel having a feed inlet end and a nonadsorbed product outlet end;

(b) a gas storage vessel;

(c) gas pumping means adapted to pump feed gas from a source of feed gas to the inlet end of the adsorption vessel;

(d) gas pumping means adapted to selectively pump nonadsorbed product gas from the nonadsorbed product outlet end of the single adsorption vessel to the gas storage vessel;

(e) conduit means connecting the nonadsorbed product outlet end of the single adsorption vessel to the storage vessel; and (f) means for withdrawing nonadsorbed product gas from the gas storage vessel.

In a preferred aspect of the apparatus embodiment of the invention, the gas pumping means of (c) is additionally adapted to selectively pump strongly adsorbed gas component from the inlet end of the adsorption vessel to a strongly adsorbed gas disposition point. In this or another preferred aspect, the gas pumping means of (c) can be adapted to function as the gas pumping means of (d).

In another preferred apparatus embodiment, the gas means of (d) is the first stage of a two stage compressor.

BRIEF DESCRIPTION OF THE DRAWING

Identical or analogous elements in the various drawing figures have the same reference numerals. Valves, lines and equipment that are not necessary for an understanding of the invention have not been included in the drawing.

Detailed Description of the Invention

According to a principal aspect, the invention comprises a process for separating the components of a gas mixture by a novel PSA process. In its broadest embodiment, the PSA process comprises continuously repeating the four main steps described above; i.e., fractionation of the gas mixture in a single adsorption vessel adsorption system at a desired superatmospheric adsorption pressure and storage of the nonadsorbed gas product of the fractionation step in a storage vessel at superatmospheric pressure; cocurrent depressurization of the adsorption vessel, preferably to a pressure below the pressure of the nonadsorbed gas product in the storage vessel, and transfer to the storage vessel of the gas released from the adsorption vessel during the cocurrent depressurization step; regeneration of the adsorbent in the adsorption vessel by countercurrent depressurization of the adsorption vessel; and repressurization of the adsorption vessel to the desired superatmospheric adsorption pressure.

An important feature of the invention is the unusual cocurrent depressurization step. This step serves to enhance production of nonadsorbed product gas by collecting the void space gas remaining in the adsorption vessel at the end of the adsorption step and combining this gas with the nonadsorbed gas product in the storage vessel. Since the average concentration of the desired nonadsorbed gas component(s) in the cocurrent depressurization gas is a only a few percentage points below the concentration of these component(s) in the nonadsorbed gas product made during the fractionation step, combining the cocurrent depressurization gas with the nonadsorbed gas product will not appreciably lower the quality of the nonadsorbed gas product. Combining the partially fractionated depressurization gas with the nonadsorbed product gas represents a signification departure from prior and currently practiced PSA processes. In earlier processes, the depressurization gas is generally discarded or used to purge the adsorption vessel during adsorbent regeneration or to repressurize the adsorption vessel in preparation for the following adsorption step of the cycle.

It can be appreciated that transferring the cocurrent depressurization gas to the storage vessel will generally require the use of a gas pumping means since, usually, the cocurrent depressurization gas is, or soon after initiation of the cocurrent depressurization step will be, at a pressure below the pressure of the nonadsorbed gas product stored in the storage vessel. As used in this description, the term "gas pumping means", or any equivalent expression used herein, means a gas compressor, a blower, an eductor or any other gas pumping device useful for transporting a gas from one point to another. The gas pumping device may be a single stage or multiple stage gas compressor, blower or pump, including positive displacement pumps, such as reciprocating pumps, cam lobe pumps or "Roots pumps"; and nonpositive displacement pumps, such as centrifugal and propeller or blower pumps.

Transfer of the cocurrent depressurization gas can be carried out to any desired extent. In some cases, as when it is desired to maintain the nonadsorbed product gas at very high purity, it may be desirable to transfer a small fraction of the depressurization gas to the storage vessel. In cases where nonadsorbed gas purity is not very critical, substantial quantities of the depressurization gas can be sent to the nonadsorbed gas storage vessel. The latter situation is usually the case when oxygen is produced from air, since the desired purity of oxygen is often around 90%, plus or minus a few percentage points. Combining most or all of void space gas remaining in the adsorption vessel at the end of the fractionation step with the nonadsorbed product gas will not lower the oxygen concentration of the product gas more than a few percent. Thus, the process of the invention includes the transfer of small quantities or large quantities, e.g., substantially all, of the void space gas to the nonadsorbed product gas storage vessel during the cocurrent depressurization step.

The process of the invention is carried out in an adsorption system comprising a single adsorption vessel and a single nonadsorbed gas product storage vessel. Since, during the course of the cocurrent depressurization step the pressure in the adsorption vessel generally drops below the pressure in the gas storage vessel, a pump is usually required to transfer cocurrent depressurization gas from the adsorption vessel to the storage vessel during this step. The pump can also be used to transfer nonadsorbed product gas from the adsorption vessel to the storage vessel during the fractionation step, if desired.

When a pump is used to charge feed gas into the adsorption vessel, the feed pump can be used to transfer nonadsorbed product gas from the adsorption vessel to the storage vessel, since the feed pump is not in use during the cocurrent depressurization step.

The process of the invention can be used to separate any gas mixture amenable to separation by PSA processes. For example, the process can be used to separate nitrogen from air, nitrogen from methane, carbon dioxide from carbon monoxide, etc. To simplify discussion of the process, the invention will be described as it applies to the separation of the nitrogen component of air from the oxygen component using an adsorbent which selectively adsorbs nitrogen.

The invention can be better understood from the accompanying drawings in which major equipment units include adsorption vessel A and nonadsorbed gas storage vessel B. Vessel A can be any vessel suitable for gas phase pressure swing adsorption processes. Vessel A can be designed to accommodate vertical flow or horizontal flow of the gas being separated. Horizontal flow designs include radial bed arrangements, in which gas flows radially through the bed, usually from the peripheral part of the vessel to the center of the vessel. To simplify discussion of the invention, vessel A will be described as a vertically oriented cylindrical vessel. Vessel A is packed with an appropriate adsorbent in particulate form. In the case of nitrogen adsorption, the adsorbent is a nitrogen-selective adsorbent, for example, zeolite 5A, zeolite 13X or another group 1A ion-exchanged type X zeolite; a calcium- or other group 2A metal-exchanged type X zeolite; etc. The preferred nitrogen-selective adsorbent is type X zeolite containing lithium ions as all or most of its exchangeable cations. The particular adsorbent used in the process of the invention is a matter of choice and is not a part of the invention.

Vessel A desirably contains a prepurification layer of desiccant, such as activated alumina or silica gel to remove water vapor contained in atmospheric air. Activated alumina is a preferred desiccant, since it also serves to remove carbon dioxide from the air, thereby reducing or eliminating the adsorption of carbon dioxide by the nitrogen adsorbent. Alternatively, the system may contain a separate air prepurification unit to remove water vapor and carbon dioxide from the air prior to its introduction into vessel A.

Vessel B can be any suitable gas storage vessel, and it may be devoid of packing or packed with an adsorbent which selective adsorbs the nonadsorbed gas produced by the process of the invention. The design and construction of vessels A and B do not form a part of this invention.

Figure 1:
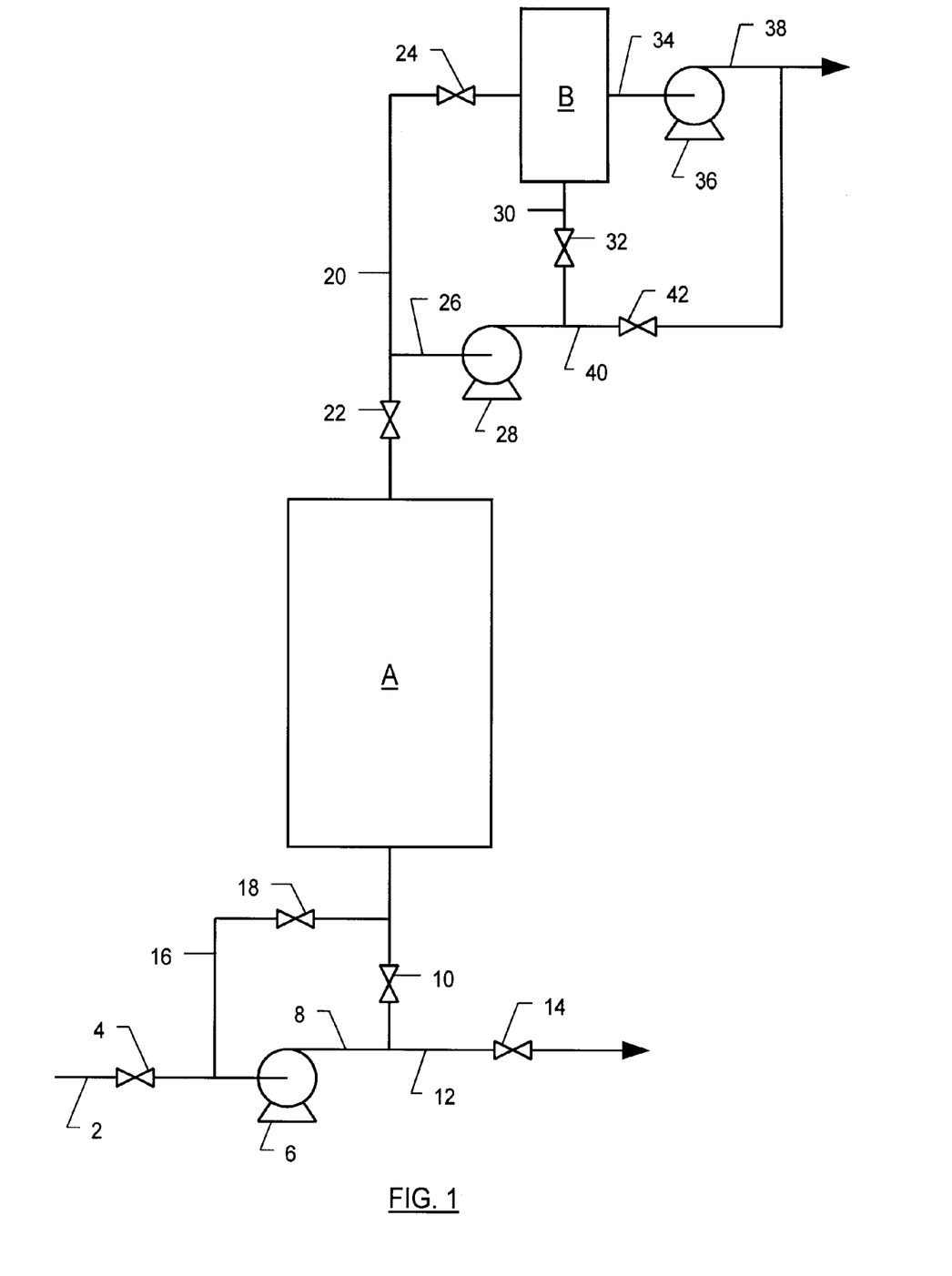
FIG. 1 is a schematic representation of one embodiment of a single adsorption vessel adsorption system of the invention.

Turning now to FIGS. 1 and 2, line 2 is connected on its upstream end with a source of feed gas, which, in the case of air separation is the atmosphere. Line 2 is provided with shutoff valve 4, and its downstream end is connected to the suction end of pump 6. The discharge end of pump 6 is connected to line 8, which, in turn, is connected to the inlet end of vessel A. Line 8 is provided with shutoff valve 10. Strongly adsorbed gas discharge line 12 joins line 8 at a point between the discharge end of pump 6 and valve 10. Line 12 is provided with shutoff valve 14. Countercurrent depressurization suction line 16, fitted with shutoff valve 18 joins line 8, at a point between valve 10 and the inlet of vessel A, to line 2, at a point between valve 4 and the suction end of pump 6.

On the downstream end of vessel A, line 20 joins the outlet end of vessel A to an opening in vessel B. Line 20 is provided with shutoff valves 22 and 24. The upstream end of line 26 joins line 20 at a point between valves 22 and 24, and the downstream end of line 26 is connected to the suction end of pump 28. Line 30, fitted with shutoff valve 32, joins the discharge end of pump 28 to an opening in storage vessel B. Line 34 connects an opening in vessel B to the suction end of pump 36. The discharge end of pump 36 is connected to a nonadsorbed product gas discharge line 38. Line 40, provided with shutoff valve 42 connects line 30, at a point between the discharge end of pump 28 and valve 32, to line 38. The downstream end of line 38 can be connected, for example, to an end use application or to further processing equipment.

The broad process embodiment of the invention using the system of FIG. 1 comprises the steps illustrated in FIGS. 2A, 2B, 2D and 2H, referred to herein as steps 2A, 2B, 2D and 2H. Just prior to the beginning step 2A, which is the fractionation step (also known as the adsorption or production step), vessel A has been pressurized with air to the desired adsorption pressure. At the start of step 2A, valves 4, 10, 22 and 32 are open and pump 28 is activated. Pump 6, which was in operation at the close of the previous cycle, continues to operate. In the embodiments illustrated in FIGS. 2 and 4, pump 36 is in continuous operation, although this pump is not a necessary part of the invention, and it can be eliminated from the system, if desired. It should also be noted that operation of pump 28 is not strictly required in step 2A, although its use can be beneficial, particularly when it is desired to operate the adsorption system under conditions such that vessel B is maintained at a higher pressure than vessel A during step 2A.

Figure 2A:
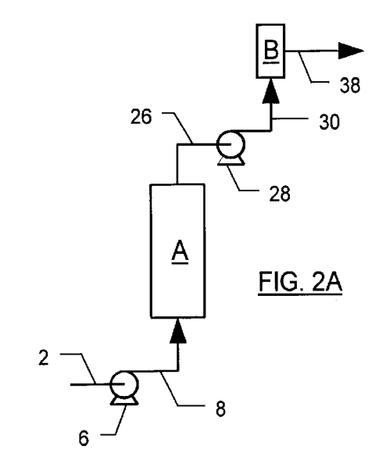
FIGS. 2A to 2H are schematic representations of the adsorption cycle steps in a preferred embodiment of the process of the invention carried out in the adsorption system of FIG. 1.
Figure 2B:
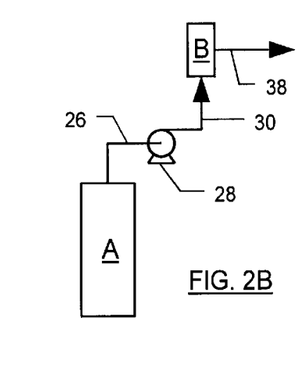

During step 2A, air is compressed to the desired adsorption pressure by pump 6 and then introduced into vessel A. As noted above, the feed air may be subjected to pretreatment steps, such as filtering and chilling. As the air passes through vessel A, nitrogen is more rapidly adsorbed by the adsorbent in vessel A than is oxygen, so that oxygen-enriched air passes out of vessel A via line 20. The oxygen-enriched air is compressed by pump 28 and delivered to vessel B for storage, pending use. As the adsorption step proceeds, an adsorbed gas front forms in vessel A and gradually advances toward the nonadsorbed gas outlet end of vessel A. When the adsorbed gas front reaches a predetermined point in vessel A, which is preferably sufficiently removed from the nonadsorbed gas outlet end of vessel A to prevent breakthrough of the strongly adsorbed gas component out of vessel A, the adsorption step is terminated and the cocurrent depressurization step (step 2B) is initiated.

Figure 2C:
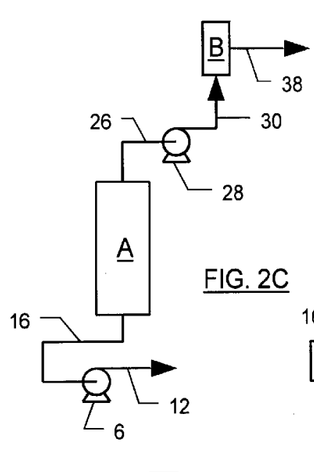
Figure 2D:
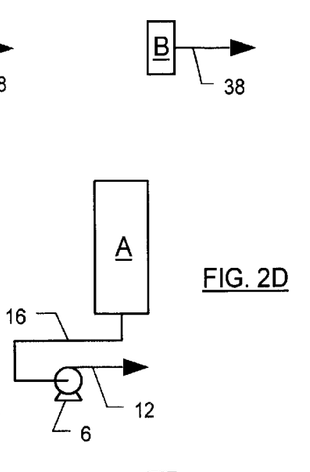

Step 2B is carried out by closing valves 4 and 10, and inactivating (or idling) pump 6. Valves 22 and 32 remain open, and pump 28 remains activated. All other valves are in the closed position. Gas contained in vessel A, particularly gas in the void spaces, is now withdrawn cocurrently from this vessel and pumped into vessel B via lines 20, 26 and 30. When the desired quantity of gas is withdrawn from vessel A, the cocurrent depressurization step is terminated and countercurrent evacuation of vessel A (step 2D) is begun. During step 2B (and all other steps of the process) nonadsorbed product gas can be continually discharged or withdrawn from vessel B via pump 36 (if used) and line 38. Accordingly, the pressure in vessel B may be lower than that in vessel A during step 2B, in which case it may not be necessary or desirable to use pump 28, since cocurrent depressurization gas will flow from vessel A to vessel B due to the difference in pressure in these vessels. However, in the preferred embodiment, pressure in vessel B during step 2B is maintained at a desired minimum level by using pump 28 to transfer cocurrent depressurization gas into vessel B.

Figure 2E:
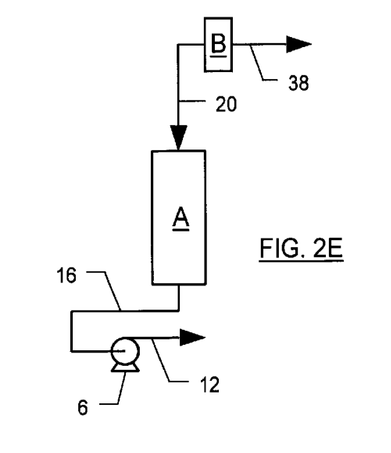
Figure 2F:
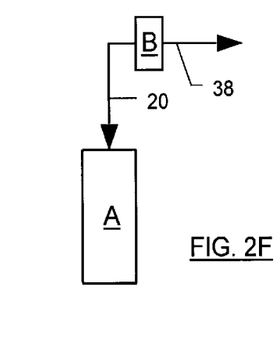
Figure 2G:
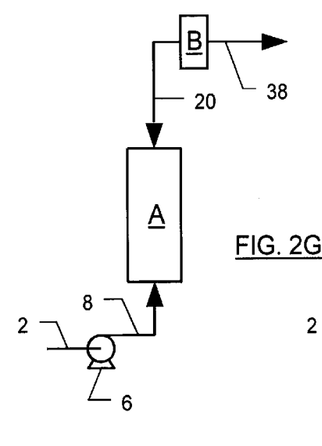
Figure 2H:
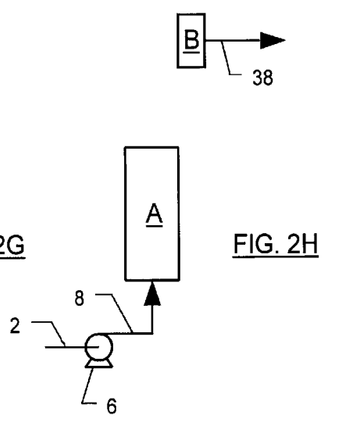

Step 2D is effected by closing valves 22 and 32 and inactivating or idling pump 28 (if used during step 2B), and opening valves 14 and 18 and activating pump 6. All other valves remain closed. If desired, pump 28 can be used during step 2D (and during all steps when it is not required to pump gas from vessel A to vessel B), in place of or as a supplement to pump 36, to pump product gas from vessel B through lines 20, 26 and 40, by opening valves 24 and 42 and activating pump 28. In any event, pump 6 now draws gas countercurrently from vessel A. As this step proceeds, strongly adsorbed component (nitrogen in the case of air separation to produce oxygen-enriched air as nonadsorbed gas component) is desorbed from the adsorbent and removed from vessel A. The desorbed gas is discharged to the atmosphere or transferred downstream and stored, used or otherwise disposed of. When the desired degree of adsorbent regeneration is effected, countercurrent evacuation of vessel A is terminated and, in one broad embodiment of the invention, repressurization of vessel A (step 2H) with air is begun.

Step 2H is accomplished by opening valves 4 and 10 and closing valves 14 and 18. All other valves remain closed and pump 6 remains activated. Pump 28 remains inactivated or in use pumping nonadsorbed product gas from vessel B. Fresh air feed is now pumped through lines 2 and 8 and into vessel A to pressurize vessel A to the desired adsorption pressure, thereby completing the adsorption cycle. The next cycle begins by repeating step 2A by opening valves 22 and 32 and putting pump 28 into service. The process is continued by repeatedly performing the above-described adsorption cycle.

In a preferred modification of the above embodiment, a purge step (step 2E) is inserted into the cycle between steps 2D and 2H. Incorporating this step into the cycle of the process has the effect of enhancing the purity of nonadsorbed gas produced by the process. During this step 2E, valves 14 and 18 remain open and pump 6 remains activated, and valves 22 and 24 are opened. Oxygen-enriched air now flows out of vessel B through line 20 and passes countercurrently through vessel A, thereby purging nitrogen from the adsorbent in vessel A. This step, which is continued to the desired extent, is usually terminated before substantial amounts of oxygen-enriched gas passes countercurrently out of vessel A. In this embodiment, step 2H immediately follows step 2E, and is initiated by closing valves 14, 18, 22 and 24 and opening valves 4 and 10, as described above.

In another preferred embodiment of the invention, a nonadsorbed gas product backfill step (step 2F) is included in the cycle between steps 2D and 2H (or between steps 2E and 2H, if step 2E is included in this embodiment). During step 2F, valves 22 and 24 are in the open position and all other valves are closed. Pumps 6 and 28 are inactivated or idled during this step. Oxygen-enriched air now flows out of vessel B, through line 20 and countercurrently into vessel A, thereby raising the pressure in vessel A. Step 2F is continued until the pressure in vessel A reaches the desired value, then further pressurization of vessel A is effected by initiation of step 2H, as described above. This is accomplished by closing valves 22 and 24 and opening valves 4 and 10 and activating pump 6, as described above. Including step 2F in the cycle likewise enhances the purity of nonadsorbed gas product by forcing any strongly adsorbed gas component in the region of the nonadsorbed gas outlet of vessel A towards the feed inlet of this vessel.

It should be noted that step 2F can be used in combination with step 2H in the manner described above, or it can completely replace step 2H in the broad embodiment of the invention or any modification thereof. This is possible because the pressure in vessel B can be maintained above the pressure in vessel A, if desired, by using pump 28 to pump nonadsorbed product-enriched gas into vessel B during step 2A and/or step 2B.

In a variation of the embodiment in which steps 2F and 2H are included in the cycle of the invention, the latter part of step 2F is combined with the first part of step 2H to form step 2G. In other words, step 2G is an overlap of steps 2F and 2H. Step 2G is initiated by opening valves 4 and 10 and activating pump 6, while maintaining valves 22 and 24 in the open position. Now, nonadsorbed product gas flows out of vessel B and countercurrently into vessel A and fresh air feed is pumped cocurrently into vessel A. This step presents the advantage of shortening the time required to repressurize vessel A. Step 2G can be used in combination with steps 2F and 2H, or it can be substituted for step 2F, substituted for step 2H, or substituted for both steps 2F and 2H, as desired. Thus, repressurization of vessel A following adsorbent regeneration can be accomplished by any one of steps 2F, 2G or 2H, or any combination of these steps.

In another modification of the process, a new step, step 2C, is inserted into the adsorption cycle, between steps 2B and 2D. Step 2C is carried out by opening valves 14, 18, 22 and 32 and activating pumps 6 and 28. During this step, vessel A is simultaneously cocurrently and countercurrently depressurized. In other words, step 2C is an overlap of steps 2B and 2D. Step 2C provides two advantages over the broad embodiment. Firstly, it has the effect of enhancing the purity of the nonadsorbed product gas by removing less pure void space gas from the bottom of vessel, thereby increasing the overall concentration of nonadsorbed gas component in vessel A. Secondly, this step also serves to shorten the time required to depressurize vessel A, thus making it possible to operate the process using shorter cycles. The duration of this step can be varied, and in the extreme, step 2C can entirely replace step 2B. It can be appreciated that this step requires the simultaneous use of pumps 6 and 28.

The process of the invention can be practiced using any combination of the above-described cycle modifications. In one most preferred embodiment, the cycle includes all of steps 2A to 2H.

Figure 3:
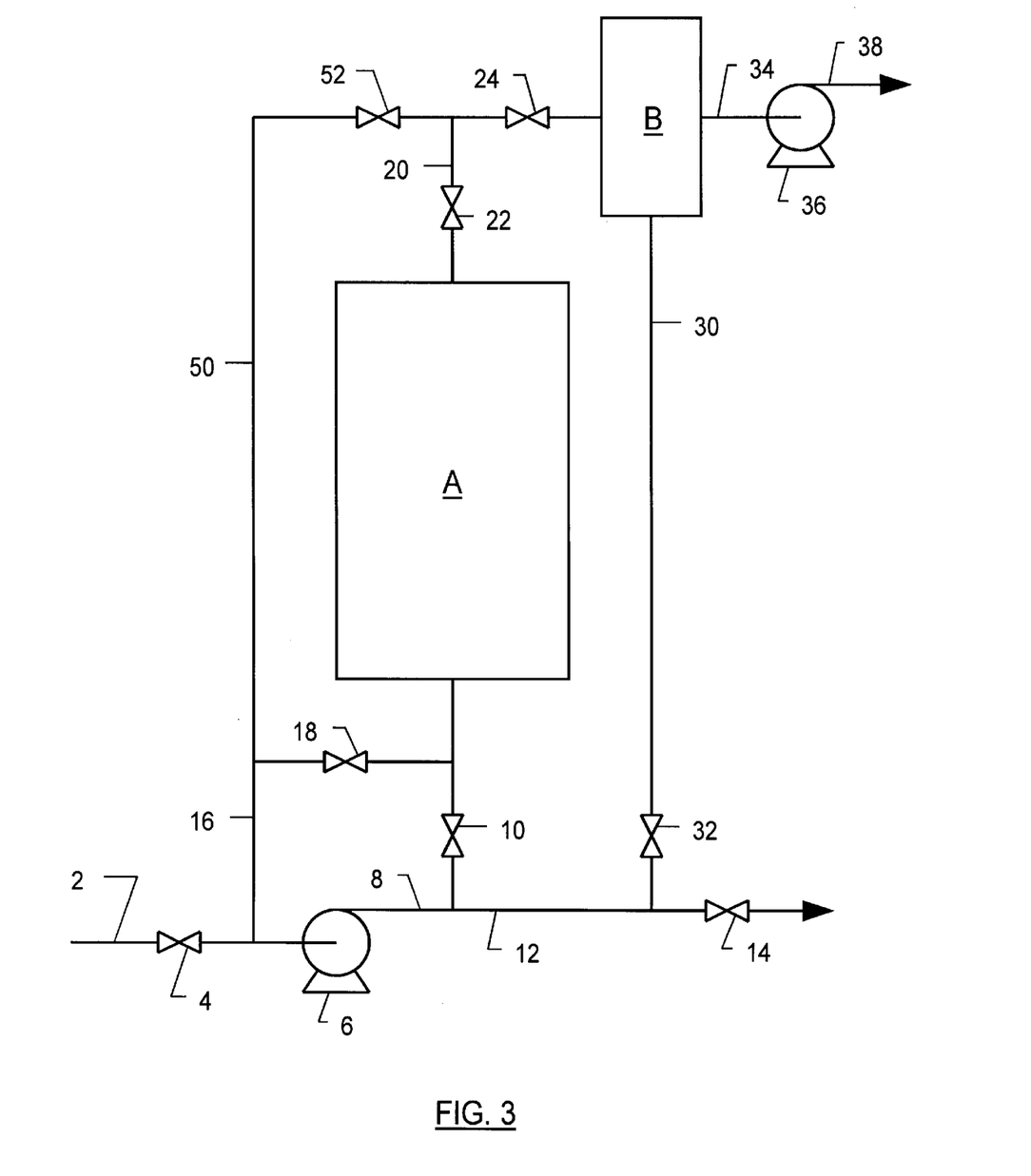
FIG. 3 is a schematic representation of an alternate embodiment of the single adsorption vessel adsorption system of the invention.

FIG. 3 illustrates an alternate arrangement of the components of the system of the invention. In the FIG. 3 version, pump 28 has been eliminated from the system, and its function in the second step of the process is performed by pump 6. The system of FIG. 3 differs from that of FIG. 1 in two respects. Firstly, lines 26 and 40, valve 42 and pump 28 have been eliminated from the system and line 30 is connected to line 12 at a point upstream of valve 14, and secondly, line 50, which is provided with shutoff valve 52, has been added to connect line 20, at a point between valves 22 and 24, to line 16, between valve 18 and the inlet suction end of pump 6.

FIG. 4 illustrates the steps of the cycle of the broad process embodiment of the invention using the system illustrated in FIG. 3. At the start of step 4A, valves 4, 10, 22 and 24 are open and pump 6, which was in operation at the close of the previous cycle, continues to operate. During step 4A, air is compressed to the desired adsorption pressure by pump 6 and then introduced into vessel A, and oxygen-enriched air passes out of vessel A via line 20, as in step 2A, passes through valves 22 and 24 and enters vessel B for storage, pending use. When the adsorbed gas front in vessel A reaches the above-mentioned predetermined point, the adsorption step is terminated and step 4B is initiated.

Step 4B is carried out by opening valves 32 and 52, closing valves 4, 10 and 24, and keeping valve 22 in the open position. All other valves are in the closed position and pump 6 remains activated. Gas contained in vessel A is now withdrawn cocurrently from vessel A by pump 6 and pumped into vessel B via lines 50, 12 and 30. During step 4B (and all other steps of the cycle) nonadsorbed product gas can be continually discharged or withdrawn from vessel B via pump 36 (if used) and line 38, as was the case in the process illustrated in FIGS. 2A to 2H. When the desired quantity of gas is withdrawn from vessel A, step 4B is terminated and countercurrent evacuation of vessel A (step 4C) is begun.

Figure 4A:
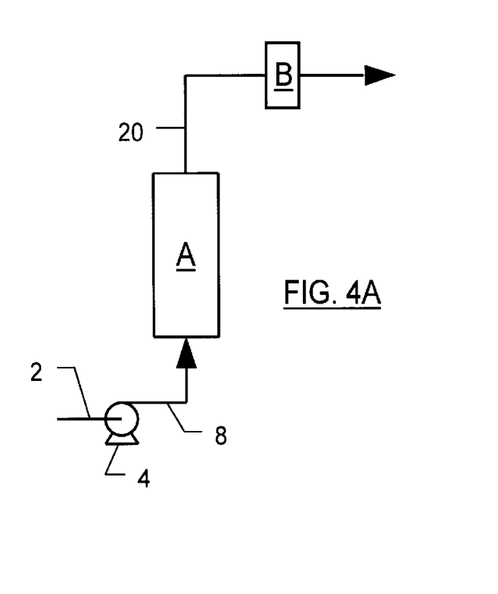
FIGS. 4A to 4D are schematic representations of the adsorption cycle steps in a broad embodiment of the process of the invention carried out in the system of FIG. 3.
Figure 4B:
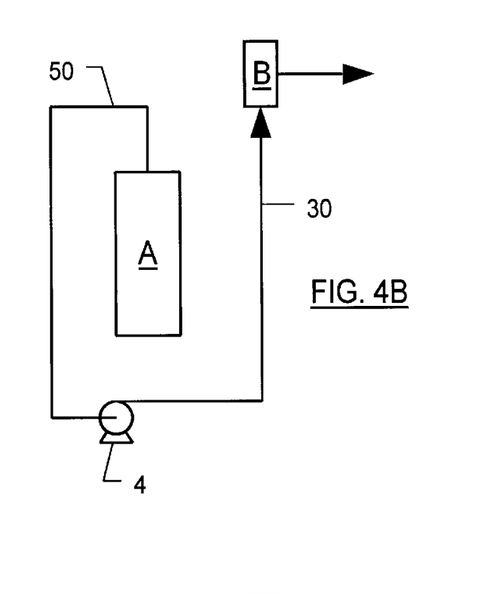
Figure 4C:
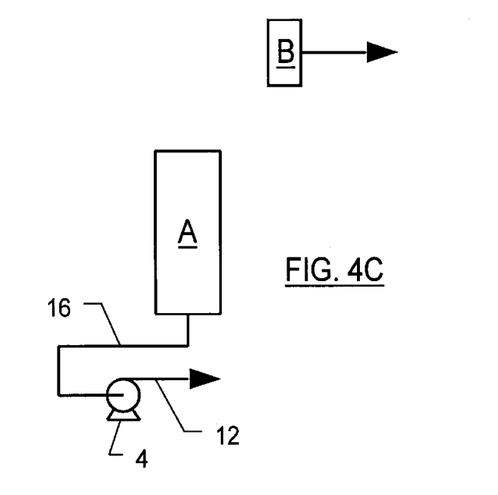
Figure 4D:
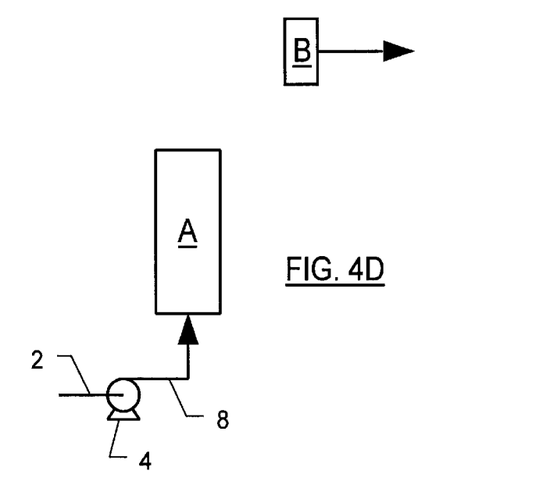

Step 4C of this cycle is effected by closing valves 22, 32 and 52 and opening valves 14 and 18. Pump 6 remains activated. All other valves remain closed. The adsorbent in vessel A is now regenerated in the manner set forth in the description of step 2D. When the desired degree of adsorbent regeneration is effected, countercurrent evacuation of vessel A is terminated and, in the broadest embodiment of this cycle, repressurization of vessel A (step 4D) with air is begun.

Step 4D is accomplished by opening valves 4 and 10 and closing valves 14 and 18. All other valves remain closed and pump 6 remains activated. Vessel A is now repressurized to the desired adsorption pressure, and the cycle is repeated, beginning with step 4A. The process is continued by repeatedly performing the above-described adsorption cycle.

A particular advantage of the process illustrated in FIGS. 4A to 4D is that the entire process can be carried out using a single pump (pump 6). Furthermore the FIG. 4A to 4D process is more efficient than the broad embodiment using the system of FIG. 1, in that pump 6 is in continuous service in the FIGS. 4A to 4D embodiment.

All of the additional steps described in the cycle of steps 2A to 2H can be incorporated into the cycle of the embodiment using the system of FIG. 3, if desired.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE

This hypothetical example is based on the system illustrated in FIG. 1, using lithium-exchanged type X zeolite as adsorbent and air as feed gas, to produce oxygen-enriched air as the nonadsorbed gas product. The cycle employed in the process includes the steps illustrated in FIGS. 2A, 2B, 2D, 2E, 2F and 2H. The total cycle time is 54 seconds, divided as follows: step 2H plus step 2A—18 secs.; steps 2B and 2F—5 secs. each; step 2D—16 secs.; and step 2E—10 secs. During step A the pressure in adsorption vessel A and in storage vessel B is about 1.47 bara. Upon completion of step A, gas is transferred from vessel A to vessel B (step 2B) until the pressure in vessel A reaches about 1.12 bara. Vessel A is then countercurrently evacuated (step 2D) to a pressure of about 0.52 bara, and then countercurrently purged with gas from vessel B (step 2E), the pressure at the end of this step being about 0.51 bara. Vessel A is then repressurized with gas from vessel B (step 2F) to a pressure of about 0.79 bara, and fully repressurized to the adsorption pressure (1.47 bara) during step 2H.

The specific product is projected to be about 44.8 $Nm^3/hr/m^3$ of adsorbent, the yield is projected to be about 51.3%, and the product gas is purity is projected to contain about 90% oxygen.

Although the invention has been described with particular reference to specific equipment arrangements, these features are merely exemplary of the invention and variations are contemplated. For example, the adsorption cycles of this invention may contain steps other than the steps described above. Furthermore, in situations in which the pressure in the product storage vessel drops rapidly after the adsorption step, as, for example, when product gas is continuously withdrawn from the storage vessel, it may not be necessary to use a pump to transfer gas from the adsorption vessel to the storage vessel during the cocurrent depressurization step. The scope of the invention is limited only by the breadth of the appended claims.

What is claimed is:

1. A process for the separation of a gas enriched in a first component from a gas mixture comprising said first component and at least one other component, comprising repeatedly performing in sequence, in an adsorption system comprising a single adsorption vessel containing an adsorbent which selectively adsorbs said at least one other component, the steps:

(a) cocurrently introducing said gas mixture at a superatmospheric adsorption pressure into said adsorption vessel, thereby adsorbing said at least one other component, while cocurrently withdrawing first component-enriched gas from said adsorption vessel and transporting said first component-enriched gas to a storage vessel;

(b) depressurizing said adsorption vessel by cocurrently withdrawing first component-enriched gas from said adsorption vessel, and transporting the withdrawn first component-enriched gas to said storage vessel;

(c) countercurrently depressurizing said adsorption vessel, thereby desorbing said at least one other component from said adsorbent and withdrawing first component-depleted gas from said single adsorption vessel;

(d) pressurizing said adsorption vessel to said superatmospheric adsorption pressure by: (1) countercurrently introducing said first component-enriched gas from said storage vessel thereinto, (2) cocurrently introducing said gas mixture thereinto, or (3) a combination of (1) and (2).

2. The process of claim 1, wherein during step (b) said adsorption vessel is depressurized to a pressure below the pressure of said first component-enriched gas in said storage vessel.

3. The process of claim 1, wherein during step (c) said adsorption vessel is countercurrently evacuated to subatmospheric pressure.

4. The process of claim 1, further comprising, between steps (c) and (d), the additional step of introducing said first component-enriched gas from said storage vessel countercurrently into said adsorption vessel while countercurrently evacuating said adsorption vessel.

5. The process of any one of claims 1 to 4, wherein steps (b) and (c) partly overlap.

6. The process of claim 5, wherein during the time when steps (b) and (c) a withdrawing and transporting of said first component-enriched gas is accomplished using first gas pumping means.

7. The process of claim 6, wherein during the time when steps (b) and (c) overlap said single adsorption vessel is evacuated with second gas pumping means.

8. The process of any one of claims 1 to 4, wherein step (d) comprises cocurrently introducing said gas mixture into said adsorption vessel.

9. The process of any one of claims 1 to 4, wherein step (d) comprises countercurrently introducing said first component-enriched gas from said storage vessel into said adsorption vessel and then cocurrently introducing said gas mixture thereinto.

10. The process of any one of claims 1 to 4, wherein step (d) comprises countercurrently introducing said first component-enriched gas from said storage vessel into said adsorption vessel, then countercurrently introducing said first component-enriched gas from said storage vessel into said adsorption vessel while cocurrently introducing said gas mixture thereinto, then cocurrently introducing said gas mixture into said adsorption vessel.

11. The process of any one of claims 1 to 4, wherein during step (a) said gas mixture is introduced into said single adsorption vessel using gas pumping means.

12. The process of claim 11, wherein step (b) is accomplished using said gas pumping means.

13. The process of claim 11, wherein step (c) is accomplished using said gas pumping means.

14. The process of any one of claims 1 to 4, wherein step (b) is accomplished using gas pumping means.

15. The process of claim 14, wherein during step (a) said first component-enriched gas is transported to said storage vessel using said gas pumping means.

16. The process of claim 14, wherein said gas pumping means is the first stage of a two-stage gas compressor.

17. The process of claim 16, wherein the second stage of said two-stage gas compressor is used to pump the first component enriched gas from said storage vessel.

18. The process of any one of claims 1 to 4, wherein said gas mixture is air.

19. The process of claim 18, wherein said first component is oxygen.

20. The process of any one of claims 1 to 4, wherein step (a) is carried out at the superatomospheric adsorption pressure in the range of about 1.1 to about 30 bara.

21. The process of claim 20, wherein during step (b) the pressure in said adsorption vessel is reduced to about 0.5 to about 15 bara.

22. The process of claim 21, wherein during step (c), the pressure in said adsorption vessel is reduced to a value in the range of about 0.15 to about 0.8 bara.

23. Adsorption apparatus for separating the components of a gas mixture comprising:

(a) a single adsorption vessel containing an adsorbent which selectively adsorbs at least one component of said gas mixture, said single adsorption vessel having a feed inlet end and a nonadsorbed product outlet end;

(b) a gas storage vessel;

(c) gas pumping means adapted to pump feed gas from a source of feed gas to the inlet end of said adsorption vessel;

(d) gas pumping means adapted to selectively pump nonadsorbed product gas from the nonadsorbed product outlet end of said single adsorption vessel to said gas storage vessel;

(e) conduit means connecting the nonadsorbed product outlet end of said single adsorption vessel to said storage vessel; and (f) means for withdrawing nonadsorbed product gas from said gas storage vessel.

24. The apparatus of claim 23, wherein the gas pumping means of (c) is additionally adapted to selectively pump strongly adsorbed gas component from the inlet end of said adsorption vessel to a strongly adsorbed gas disposition point.

25. The apparatus of claim 23 or claim 24, wherein the gas pumping means of (c) is adapted to function as the gas pumping means of (d).

26. The apparatus of claim 23, wherein the gas pumping means of (d) is the first stage of a two stage compressor.

27. The apparatus of claim 26, wherein the second stage of said two stage compressor is adapted to function as the means of (f).

* * * * *